May 25, 1943.　　K. JANISZEWSKI　　2,320,240
DIE SET ASSEMBLY
Filed Dec. 23, 1940　　2 Sheets-Sheet 1

INVENTOR
KASIMIR JANISZEWSKI
BY
Wheeler, Wheeler & Wheeler
ATTORNEYS.

May 25, 1943.   K. JANISZEWSKI   2,320,240
DIE SET ASSEMBLY
Filed Dec. 23, 1940                    2 Sheets-Sheet 2

INVENTOR
KASIMIR JANISZEWSKI
BY
Wheeler, Wheeler + Wheeler
ATTORNEYS.

Patented May 25, 1943

2,320,240

UNITED STATES PATENT OFFICE 2,320,240

DIE SET ASSEMBLY

Kasimir Janiszewski, Milwaukee, Wis.

Application December 23, 1940, Serial No. 371,252

12 Claims. (Cl. 308—5)

This invention relates to improvements in die set assemblies.

It is the primary object of the invention to provide in attachment form novel and improved means for lubricating the sliding bearing between the leader pin and bushing of a conventional die set and for guarding the clearance between the leader pin and bushing of such a set against accidental introduction of any portion of the operator's body. It is my purpose to make a device of this character which may be readily applied to existing die set structures and may also be incorporated with facility in new assemlies.

As to most of the embodiments herein disclosed, it is an object of the invention to provide means whereby the lubricating device is made up independently of the leader pin and bushing, although one embodiment of the invention herein disclosed shows the lubricating device formed as an integral part of the bushing. The reason why it is preferred to make the lubricating device independently is because it can readily be fabricated from relatively soft metal by following the teachings of this invention, whereas the leader pin and bushing are ordinarily made of fairly hard steel.

It is a further object of the invention to provide a simplified die set construction in which the leader pin and bushing are both tubular and are welded to the respective pressure plates instead of being driven into holes therein, thus saving considerably in machining costs, labor, and material as compared with standard practices heretofore prevailing.

With respect to the protective features, it is an object of the invention to provide guard means for preventing the operator from passing his hand or other portions of his body between the leader pin and bushing while permitting the guard means to expand and collapse automatically to accommodate relative movement between the platen and bed of the die set, the collapse of the guard means being so complete as to permit the entire guard means to be accommodated within the space required by the attachment itself, such space being no greater than that necessarily included between the platen and the bed to receive the dies.

Other objects of the invention will be apparent to those skilled in the art upon examination of the following disclosure of the invention.

In the drawings.

Like parts are identified by the same reference characters throughout the several views.

Figure 1:
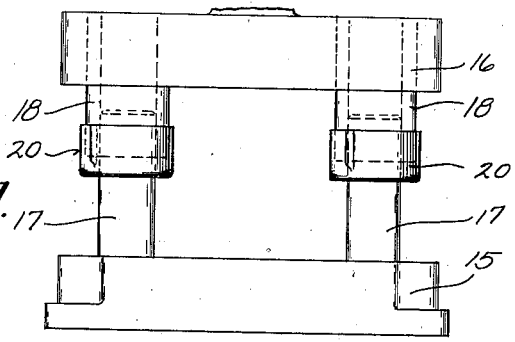
Fig. 1 is a fragmentary view in side elevation of a die set including lubricating means made in accordance with the present invention.

The device illustrated in Fig. 1 comprises the conventional bed 15 and platen 16 of a die set, the usual arrangement being such that the dies are fastened respectively to the platen and bed in the use of the set.

Projecting upwardly from the bed are two or more leader pins 17 telescopically received during the reciprocation of the platen 16 into the bushings 18 of the platen. In some installations the leader pins and bushings are permanently in telescopically bearing relation but in others considerable separation between the bushing and leader pin occurs at the top of the platen stroke.

As a means of lubricating the bearing surfaces of the leader pin and bushing in the course of their relative reciprocation, I provide at 20 a cup-shaped member applicable with a pressed fit over the lower end of the bushing 18 and preferably having, for the purposes of such fit, a cylindrical wall 21 having the internal diameter corresponding to the external diameter of bushing 18. The wall is usually not wholly cylindrical however, being preferably ribbed at 22 to provide an oil inlet hole at 23 between the rib and the exterior surface of the bushing.

Figures 2, 3, 4:
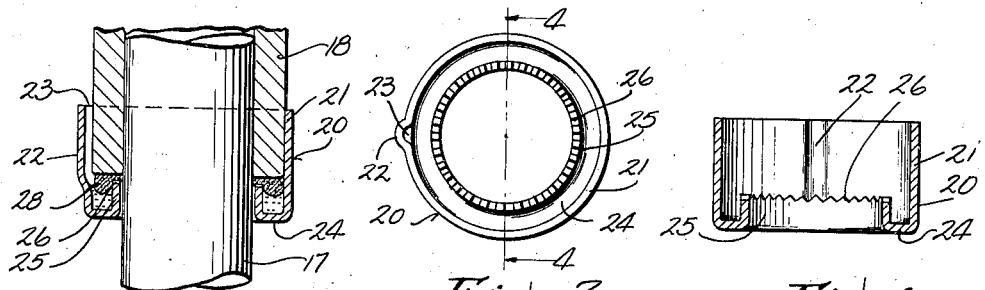
Fig. 2 is an enlarged fragmentary detail in section through the bushing and lubricating means showing the manner in which the lubricating means is applied to the bushing and leader pin.
Fig. 3 is an enlarged detail view in plan of the metal cup portion of the lubricating attachment.
Fig. 4 is a detail view in section through the metal cup portion of the attachment on the line 4—4 of Fig. 3.

The oil cup 20 is of annular form, having an annular bottom wall at 24 and being turned upwardly at 25 to provide an inner periphery preferably having terminal teeth at 26. The inner peripheral wall 25 is preferably spaced slightly from the leader pin 17 as shown in Fig. 2.

Figures 5, 6:
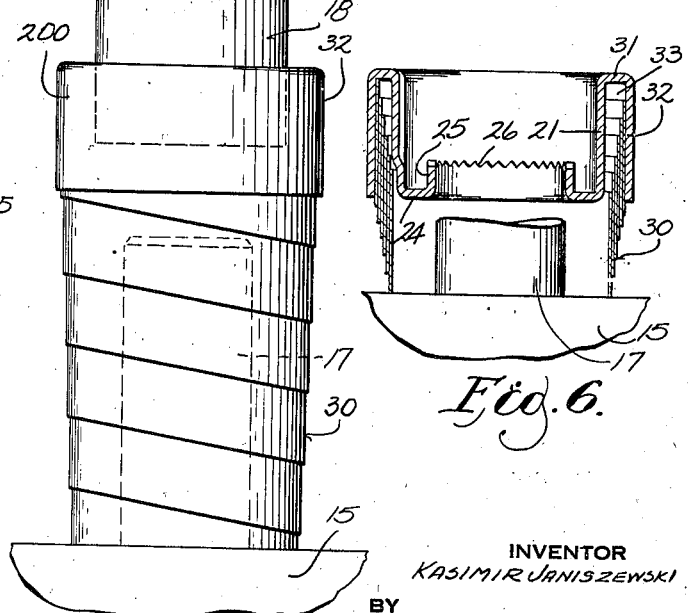
Fig. 5 is an enlarged detail view in side elevation showing a modified lubricating attachment incorporating the guard in accordance with the preferred practice of the invention.
Fig. 6 is a view in cross section showing the lubricating cup and guard used in the device of Fig. 5.

Clamped between the teeth 26 of the inner peripheral wall 25 and the lower end of bushing 18 is a gasket 28 of felt or the like which constitutes a wick. This annular gasket has its inner periphery no larger than the diameter of the leader pin 17 so that it is in direct bearing contact with the leader pin as the leader pin slides through the annular cup in the course of the reciprocation of the plate. The oil introduced into the annular cup through the oil duct 23 is carried by the wick or gasket 28 to the bearing surface of the leader pin.

Where the guard means is desired, the cup 200 has an annular bottom 24, an upturned inner peripheral wall 25 and an outer wall 21 exactly as heretofore described, but the outer wall 21 is turned outwardly at 31 and downwardly at 32 to provide a downwardly opening annular recess 33 into which is telescopically collapsible a volute spring guard 30 which is shown collapsed in Fig. 6 but is biased for normal expansion to the position shown in Fig. 5 whereby it normally fills the entire space between the bed 15 and the bushing 18 carried by the platen.

The projection of the lubricating cup below the end of the bushing is very slight, as will be apparent in Figs. 1, 2 and 5. Yet a guard sufficiently elongated to contact the bed at all times may be completely collapsed within the outer overhanging wall 32 of the special form of the lubricating cup shown in Figs. 5 and 6, the successive coils of the guard being preferably made of clock spring or the like and sufficiently thin to collapse upon each other in spiral form on the approach of the bed and in helical spiral form as the bed recedes.

Figure 7:
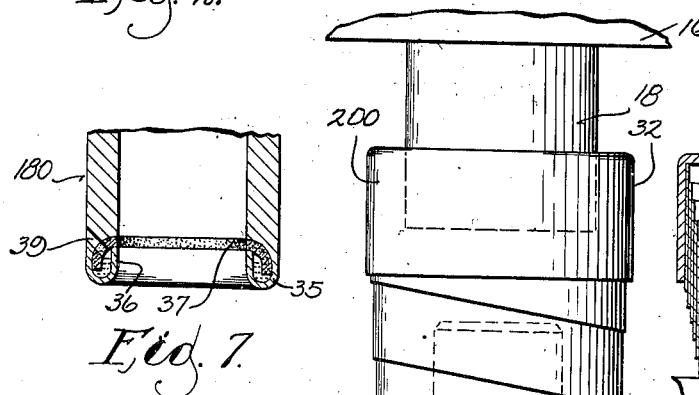
Fig. 7 is a detail view similar to Fig. 2 showing a modified form of lubricator integral with the bushing.
Figure 8:
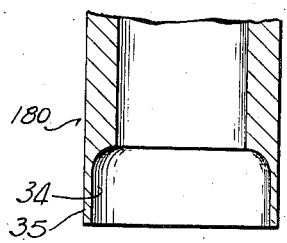
Fig. 8 is a view in section of the bushing at an intermediate point in the manufacture of the device shown in Fig. 7.

The lubricating cup may be integral with the bushing as shown in the embodiment of the invention illustrated in Figs. 7 and 8. The bushing 180 has its lower end reamed out as indicated at 34 in Fig. 8 to leave a relatively thin external wall 35 which is then turned inwardly and upwardly upon itself as indicated at 36 in Fig. 7 to constitute the inner periphery of an annular lubricating cup of which the original wall portion 35 constitutes the external periphery. The inturned wall 36 serves as a retainer for the annular gasket 37 which dips into the annular cup to constitute a wick as in the device previously described. A hole 39 bored laterally and downwardly through the bushing into the cup portion of the lower end thereof permits the supply of oil within the annular cup to be replenished. In this device, as in the devices shown in the other views of the drawings, there is an annular cup of no greater cross section than the thickness of the bushing itself, the inner periphery of the annular cup being spaced from the interior bearing surface of the bushing to accommodate the gasket wick.

The preferred embodiments of the invention permit the ready manufacture of the lubricator from highly ductile metals and the ready application of the lubricator to the bushings and leader pins of existing die sets.

Figure 9:
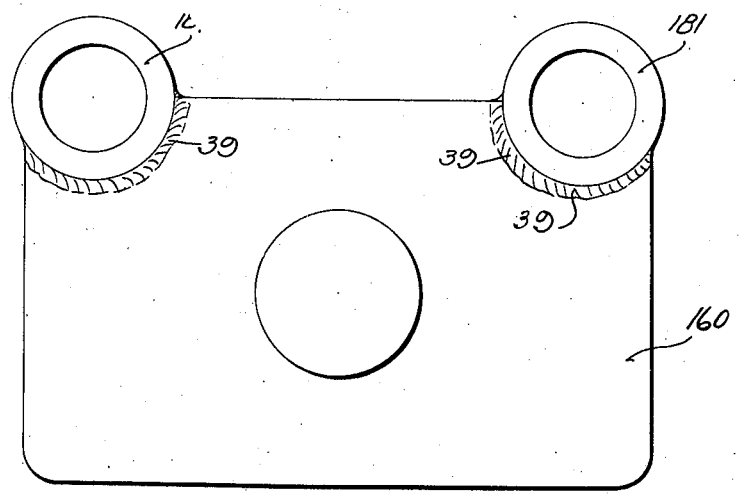
Fig. 9 is a plan view of a plate and bushing assembly comprising a modified embodiment of the invention.
Figure 10:
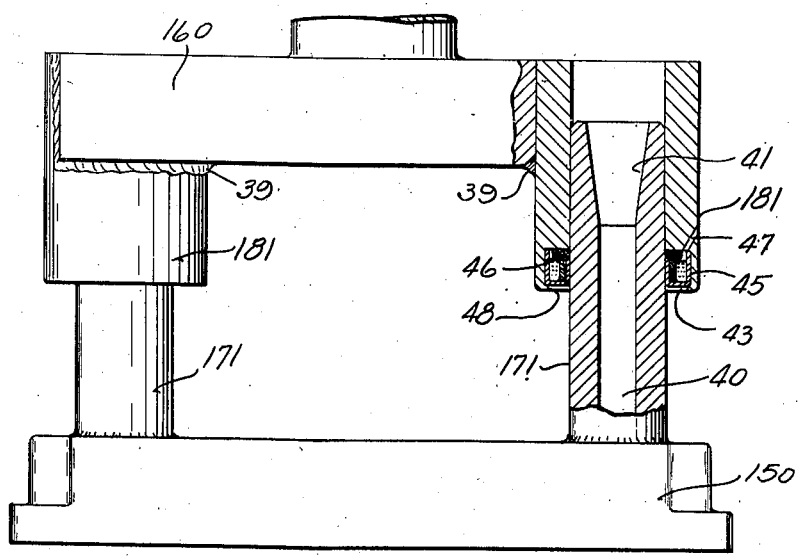
Fig. 10 shows partially in side elevation and partially in section, a die set assembly employing the structure of Fig. 9.

A very inexpensive die set may, however, be made with a special adaptation of the lubricating feature above described and shown in Figs. 9 and 10. The press plate 160 and the bed plate 150, instead of being large enough to receive the pins and bushings with a driven fit, as is customary, are reduced in size and have material removed at the corners to provide recesses in which the bushings 181 are secured by welds 39 to the plate 160, the leader pins 171 being similarly welded to the platen 150.

To accomplish welding, the leader pins and their respective bushings are assembled upon a suitable jig or fixture which holds them in proper axial alignment in the respective pairs and at right angles to the respective plates while the welding operation is performed. To accommodate such a jig or fixture the leader pins 171 are made tubular, having a hollow interior bore 40 and preferably being provided with a counterbore at 41 as shown in Fig. 10. The tapering counterbore 41 is adapted to receive a complementary form of jig for maintaining the parts in the specified relation. Since the bushing and leader pin are positioned by interior engagement with a jig or fixture and do not require a driven fit in connection with any hole in the plates 150 or 160, it is unnecessary to surface accurately the outside portions of the leader pin and bushing which are engaged with their respective plates. The welding operation, therefore, saves considerable labor in this regard. That portion of the leader pin within which the jig or fixture engages should, however, be accurately finished co-axially with the bearing surfaces of the leader pin and bushing.

In this low cost construction the leader pins and bushings would not ordinarily be hardened, and it is therefore convenient to provide for lubrication by providing a counterbored recess at 43 in the lower end of each bushing and inserting into the recess an annular channel 45, the outer peripheral wall of which has a pressed fit in the counterbore 43 and the inner peripheral wall of which is made to correspond in diameter to the interior bore of the bushing. The inner wall also serves as a retainer for the wick system 46 which bears against the leader pin and dips into the annular reservoir to pick up lubricant which may be introduced into the reservoir through the filling opening 47 in the bushing.

While a pressed fit is ordinarily adequate to retain the annular reservoir in the counterbore of the bushing, the end of the bushing may be upset at 48 if desired, so as to fix the reservoir permanently in place.

I claim:

1. A device of the character described comprising the combination with a bushing and a leader pin telescopically slidable therein, of an annular lubricating cup encircling the leader pin and having a relatively elongated external wall engaged externally with the bushing and having an inner peripheral wall of annular form spaced from the end of the bushing and surrounding the path of reciprocation of the leader pin, and wick means positioned between the inner peripheral wall of said cup and the end of the bushing.

2. In a device of the character described, the combination with an annular bushing and a leader pin reciprocable therein, of an annular lubricating cup having an elongated exterior wall mounted externally on the bushing and having a shorter interior peripheral wall spaced from the leader pin and spaced axially of the leader pin from the end of the bushing, together with an annular gasket constituting a wick and clamped between the inner wall of said cup and the end of the bushing.

3. In a device of the character described, the combination with an annular bushing and a leader pin reciprocable therein, of an annular lubricating cup having an elongated exterior wall mounted externally on the bushing and having a shorter interior peripheral wall spaced from the leader pin and spaced axially of the leader pin from the end of the bushing, together with an annular gasket constituting a wick and clamped between the inner wall of said cup and the end of the bushing, said inner wall being provided with teeth constituting means for positively fixing the position of said gasket and the external wall being ribbed whereby to provide between said wall and the bushing an inlet duct for replenishing the lubricant within said cup.

4. A device of the character described, comprising a bushing having an annular bearing portion with interior and exterior peripheral surfaces and having a terminal wall portion of reduced thickness folded back on itself comprising an extension of one peripheral surface into proximity to the other peripheral surface, whereby to provide an annular lubricant retaining cup integral with the bushing.

5. In a device of the character described, a bushing interiorly counterbored to provide a terminal wall portion reduced in thickness from the inside and turned inwardly and axially upon itself, said bushing having a bearing surface in spaced relation to the axially turned wall portion aforesaid, and openings interposed between said bearing surface and said axially turned wall portion, said axially turned wall portion constituting the inner periphery of an annular cup integral with said bushing.

6. A combined lubricating and guard attachment for die sets comprising an annular cup-shaped fitting applicable to a die set bushing and providing an annular chamber immediately below the end of the bushing, wick means for delivering lubricant from said chamber to a leader pin engageable in said bushing, and means for protecting the gap between said bushing and said leader pin when the leader pin and bushing are separated, said protecting means comprising a resiliently collapsible volute spring, said fitting having an annular socket in which the upper end of said spring is seated, and a bed member for the leader pin upon which the lower end of the spring is seated when in collapsing position.

7. A device of the character described, comprising the combination with a fitting applicable to a die set bushing and comprising a lubricator therefor, of a downwardly turned flange carried by said fitting and spaced therefrom to provide a rest, and a clock spring of volute form biased for projection axially from said recess and resiliently collapsible under pressure into said recess, said spring being adapted to constitute a guard about the space between the die set bushing and the leader pin reciprocable therein.

8. The combination with platen and bed members of a die set, of collapsible guard means interposed therebetween and comprising a volute clock spring having overlapping flat coils biased for extension in frusto-conical form and resiliently collapsible into nested relation, and means for connecting said guard means to one of said members to be collapsed by engagement with the other, said guard means surrounding a leader pin connected with one of said members.

9. In a die set, the combination of an apertured mounting plate, a bushing in said aperture, a leader pin having a continuously smooth cylindrical exterior surface adapted for sliding bearing relation to the inner surface of the bushing, an annular lubricator cup carried by the lower end portion of the bushing, with its inner wall providing an opening slightly larger than the leader pin and in registry therewith, and a wick in said cup having a portion in position for annular contact with the leader pin between the inner wall of the cup and the lower end of the bearing portion of the bushing.

10. In a die set, the combination of an apertured mounting plate, a bushing in said aperture having an interior continuous bearing surface for a leader pin, a leader pin having a continuously smooth cylindrical exterior surface in sliding bearing relation to the inner surface of the bushing, an annular cup-shaped oiler attached to the bushing and through which the leader pin may pass, said oiler having an inner peripheral wall spaced from the bearing portion of the bushing, and means for introducing lubricant into said cup-shaped oiler and feeding it slowly over its inner margin to the leader pin while the mounting plate and oiler are reciprocated.

11. In a die set, the combination of an apertured mounting plate, a bushing in said aperture having a free lower end portion and an interior continuous bearing surface for a leader pin, a leader pin having a continuously smooth cylindrical exterior surface adapted for sliding bearing relation to the inner surface of the bushing, an annular cup-shaped oiler attached to the free end portion of the bushing and provided with an inner peripheral wall having a serrated upper margin, and means for introducing lubricant into said cup-shaped oiler.

12. In a die set having a leader pin, the combination of an apertured mounting plate, a bushing in the aperture having a free lower end portion and an interior continuous bearing surface for said leader pin, and an annular cup-shaped oiler having a sleeve portion telescopically engaged with the free end portion of the bushing and provided at its lower end with an inwardly extending bottom and an upwardly turned flange co-axial with and at approximately the radius of said bushing bearing surface, said flange being adapted to retain an oiler wick in operative proximity to the free lower end portion of the bushing, and said oiler pin being provided with means for introducing lubricant into the space between said sleeve and flange.

KASIMIR JANISZEWSKI.